(12) United States Patent
James

(10) Patent No.: US 9,555,753 B2
(45) Date of Patent: Jan. 31, 2017

(54) VEHICLE MOBILE MICROGRID

(71) Applicant: Harry K. James, Orange, CA (US)

(72) Inventor: Harry K. James, Orange, CA (US)

(*) Notice: Subject to any disclaimer, the term of this patent is extended or adjusted under 35 U.S.C. 154(b) by 108 days.

(21) Appl. No.: 14/204,574

(22) Filed: Mar. 11, 2014

(65) Prior Publication Data

US 2014/0300182 A1    Oct. 9, 2014

Related U.S. Application Data

(60) Provisional application No. 61/786,183, filed on Mar. 14, 2013.

(51) Int. Cl.
*B60R 16/03* (2006.01)

(52) U.S. Cl.
CPC ............. *B60R 16/03* (2013.01); *Y02T 10/92* (2013.01)

(58) Field of Classification Search
CPC ................................ Y02T 10/92; B60R 16/03
USPC ........................................................ 307/10.1
See application file for complete search history.

(56) References Cited

U.S. PATENT DOCUMENTS

| | | | | |
|---|---|---|---|---|
| 7,188,162 B1 * | 3/2007 | Fredriksson | ......... | G05B 19/042 703/13 |
| 8,864,207 B2 * | 10/2014 | Hixson | ................. | B60P 3/0257 296/22 |
| 2003/0222624 A1 * | 12/2003 | Votoupal | ............... | H02J 7/1446 320/150 |
| 2011/0083920 A1 * | 4/2011 | Mori | ..................... | B60H 1/025 180/68.4 |
| 2013/0073104 A1 * | 3/2013 | Sciacchitano | .......... | H02J 3/382 700/295 |
| 2014/0375272 A1 * | 12/2014 | Johnsen | .................. | B60L 11/16 320/136 |

FOREIGN PATENT DOCUMENTS

WO       WO2010133636 A2 *   11/2010   .............. B60L 11/18

* cited by examiner

*Primary Examiner* — Jared Fureman
*Assistant Examiner* — Duc M Pham

(57) ABSTRACT

The vehicle mobile microgrid is a vehicle on-board electrical grid dedicated to supplying all supplemental electrical needs for the vehicle utilizing recovered energy from internal combustion engine heat, vehicle motion and auxiliary electrical power generator, chemical and mechanical storage systems and electrical power from incident light energy. Unlike electrical grids that serve wide population areas, the vehicle on-board electrical grid is not meant to serve electrical demand beyond that utilized by the vehicle. This on-board electrical grid is therefore very small by comparison, and the term microgrid is meant to convey this comparative size. The microgrid utilizes a common-mode bidirectional microgrid to efficiently capture, store and distribute electrical power depending on the vehicle's demand for electrical power.

3 Claims, 5 Drawing Sheets

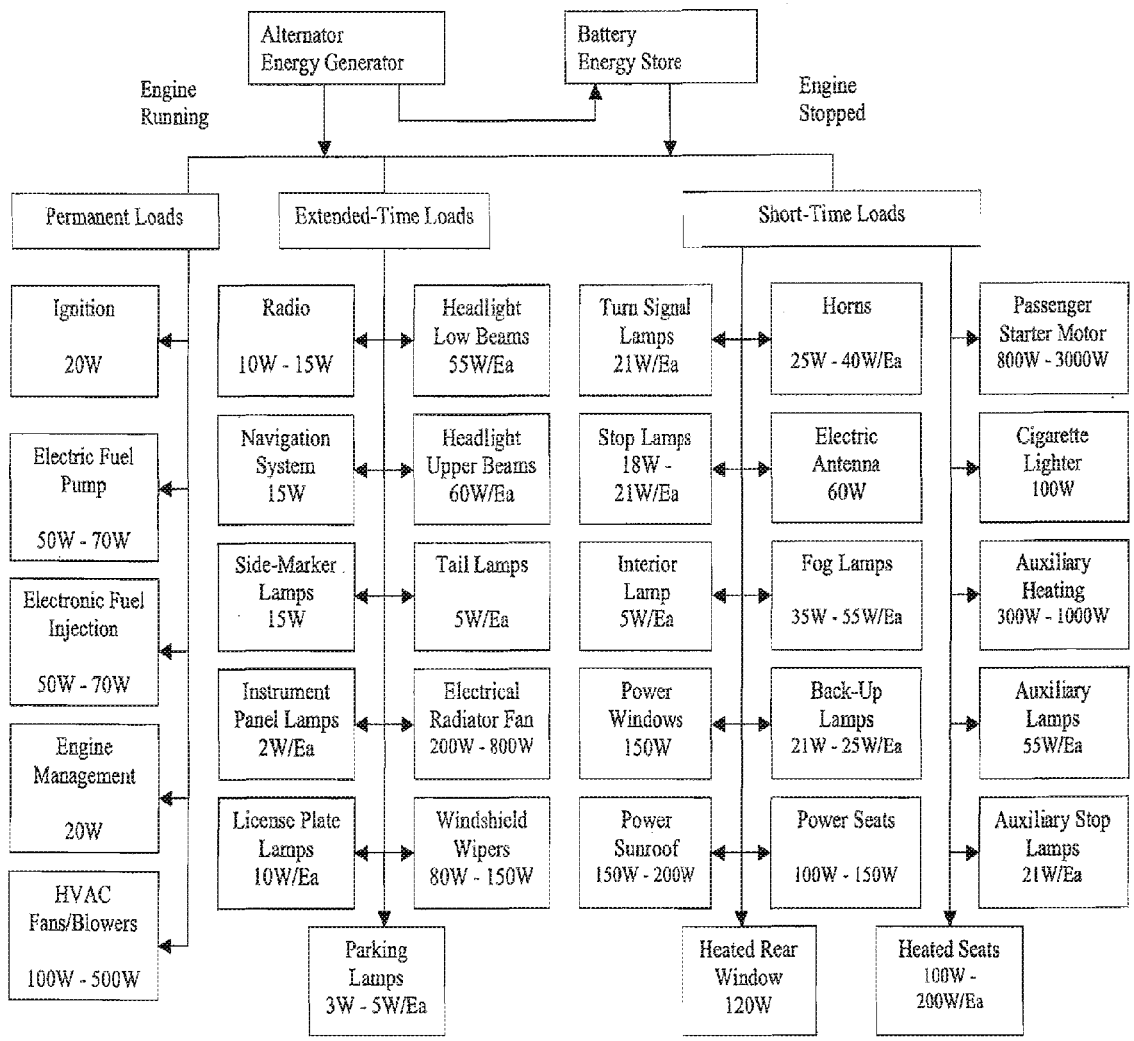
Figure 1: Typical Average Internal Combustion Engine Motor Vehicle Power Requirements

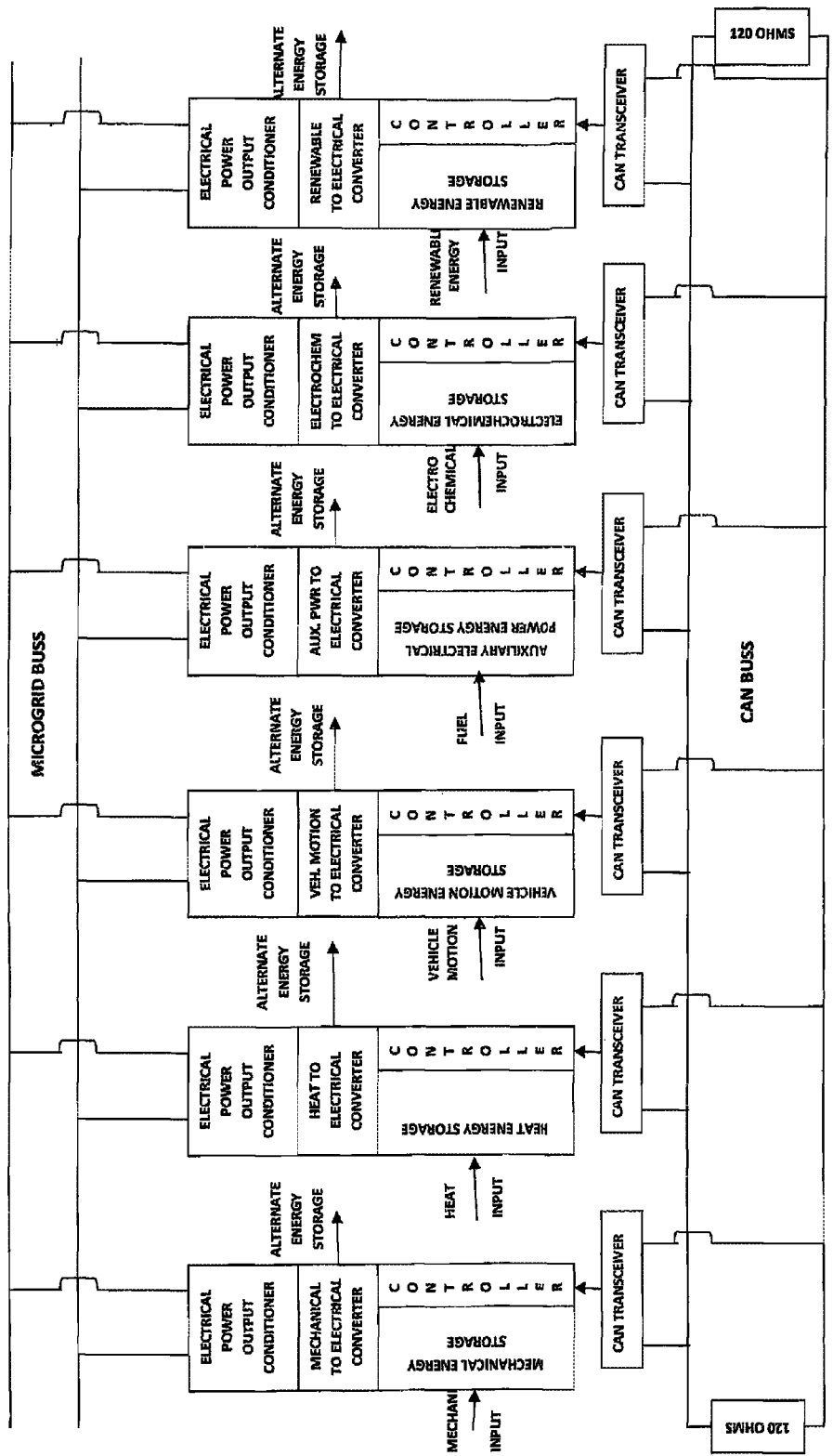
Figure 2. Schematic Diagram of Electrical Generation Sources and Energy Storage Subsystems

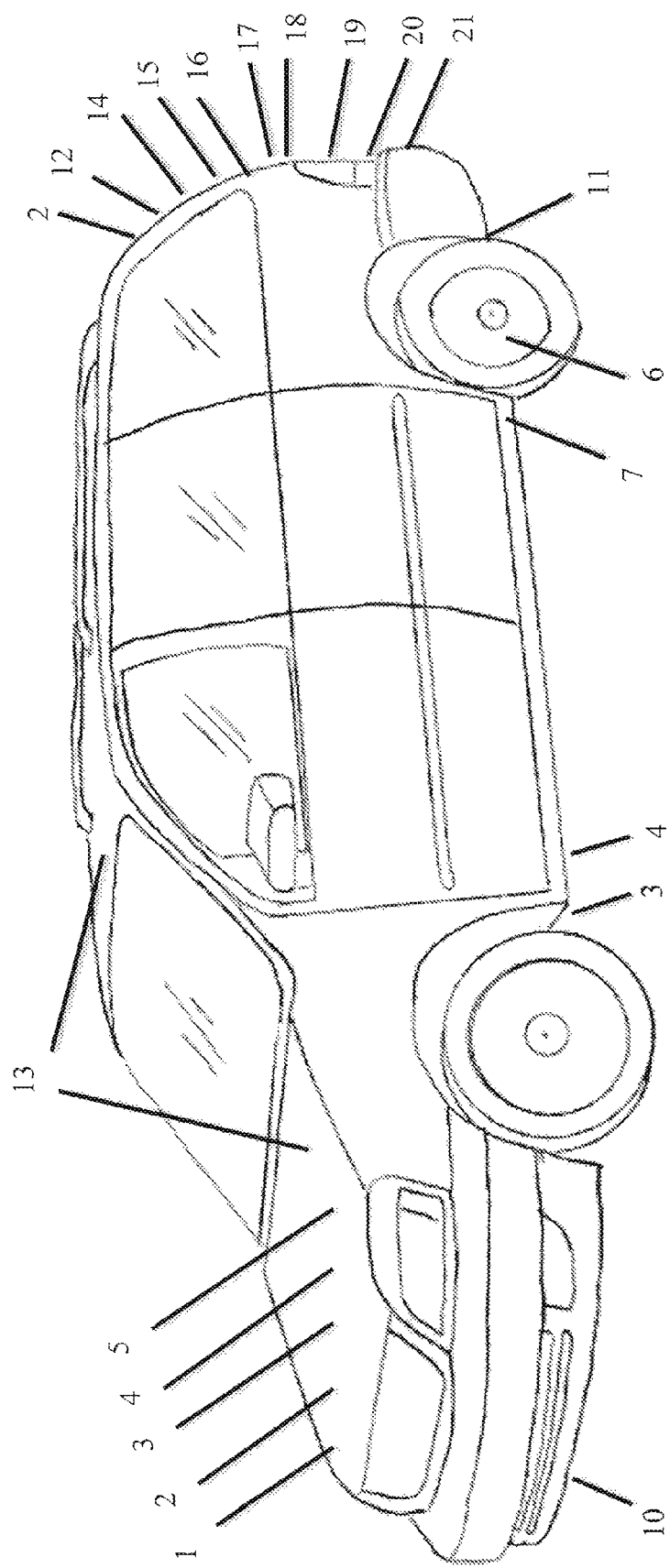
Figure 3. An Embodiment of the Invention as Applicable to a Private Passenger Vehicle

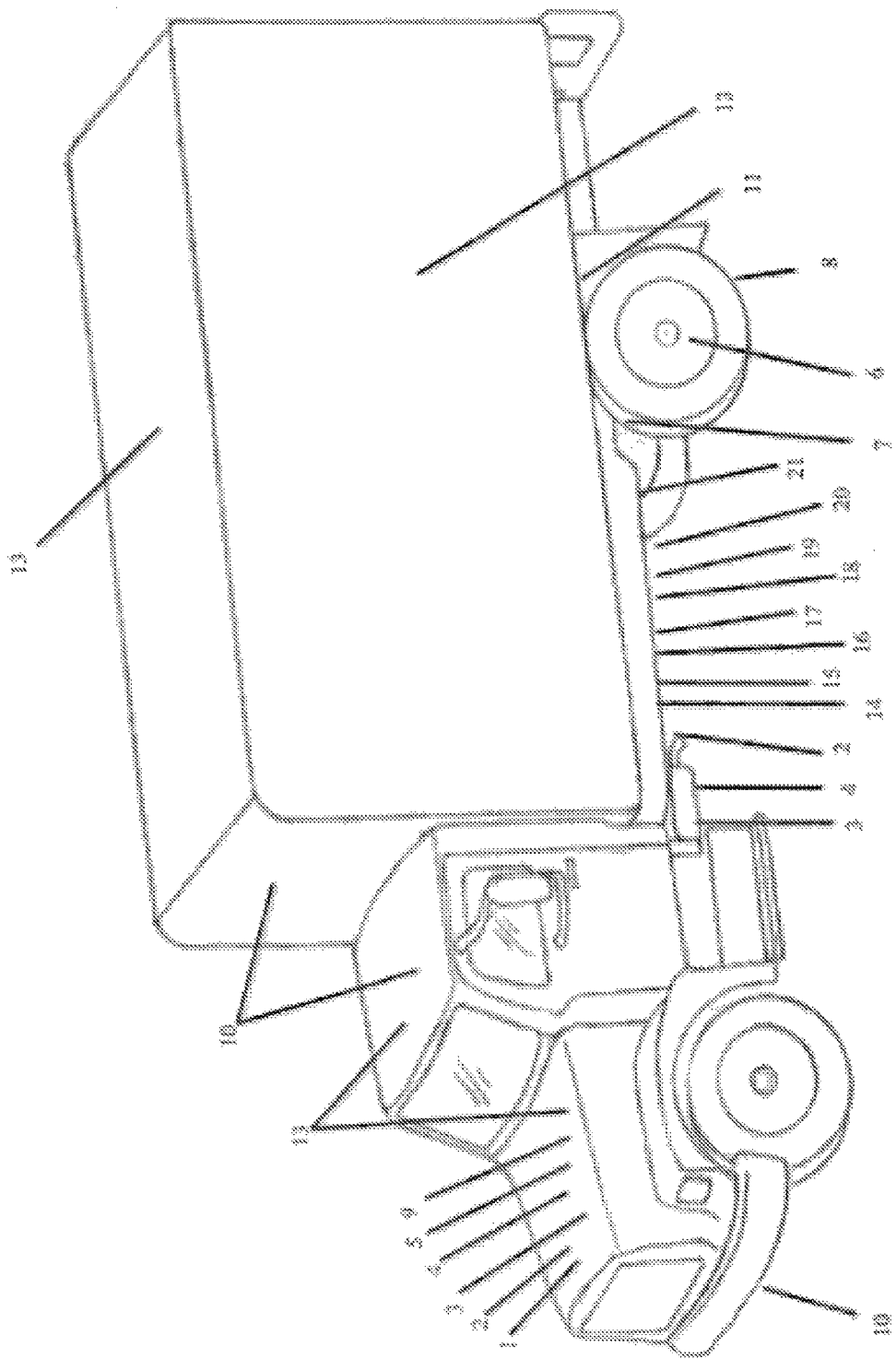
Figure 4. Embodiment of the invention as Applicable to a Mid-Sized Commercial Delivery Truck

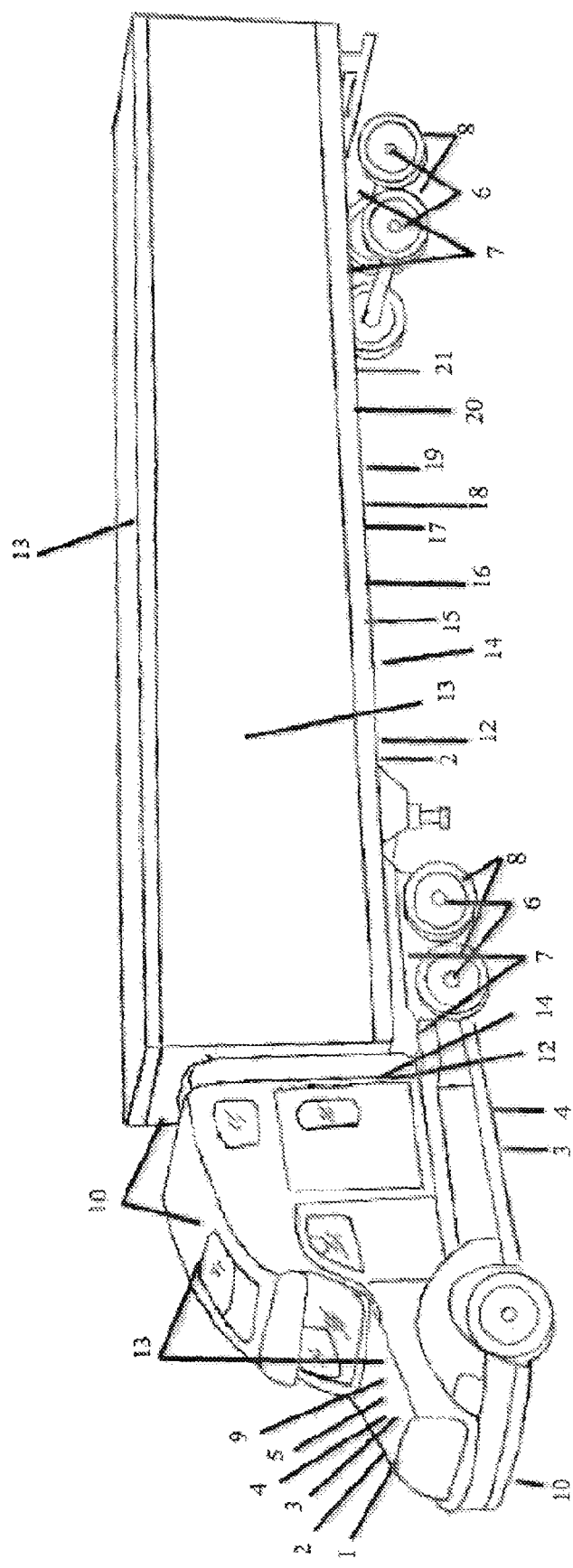
Figure 5. An Embodiment of the Invention as Applicable to a Heavy-Duty Commercial Tractor-Trailer

VEHICLE MOBILE MICROGRID

BACKGROUND OF THE INVENTION

As motor vehicle configuration transitions from internal combustion engine to hybrid combinations of internal combustion engine and electric motor to all electric motor drive vehicles, a greater dependence on electric power generation and storage must evolve to match the demands placed on the vehicle's performance.

There are many sources of energy available for conversion to electricity to be used as generated or for storage on board the vehicle until needed to meet demand. These known sources and undeveloped sources will generate electricity as alternating current or direct current. Alternating current generation will vary by power and frequency while direct current will vary by power output.

As with the major power grids, these varying output systems must be made to link to a common grid in order to make generated power available for distribution to systems that require electricity to function.

To this end, it is appropriate to propose a methodology for creating the means to capture these various sources of electrical power, establish a common-denominator means to condition these various sources to a common mode so that a practical bidirectional grid may be efficiently used to capture electrical power generated and distributed for use or storage depending on the mobile vehicle's demand.

To be clear: this is not a vehicle-based mobile electric power system; i.e., a power system transported to a site by a vehicle where no power is available from a utility or stationary generator. It is an onboard power generating use and storage system whose primary mission is to provide electrical power to the vehicle. It is an onboard electrical power station or energy center or plant. By its size, it can be described as a microgrid.

Historically, the demand for electrical power for internal combustion engine motor vehicles has increased steadily. From 1950 to 1980, for example, required generator/alternator output increased by about 500%. For the foreseeable future, this demand will continue to increase due to the growing amount of onboard electrical equipment that has become an integral part of every new vehicle design for safety, comfort and convenience.

For current internal combustion engine motor vehicles, with the engine stopped, the battery is the vehicle's energy store and, with the engine running, the alternator becomes the onboard electrical generating plant. For trouble-free generation, it is necessary that alternator output, battery capacity, starter power requirements and electricity consuming loads are matched and optimized.

In a normal driving cycle, the battery must always have sufficient charge so that the motor vehicle can be restarted, despite the needs for critical safety and security systems continuous functionality. With the vehicle parked, electrically consuming loads should continue to operate for a reasonable period without discharging the battery to the extent that the vehicle cannot be restarted.

The conventional lead-acid storage battery used in motor vehicles led to the development of the direct current (DC) generator. A DC generator was required in order to recharge the battery, a DC device. Because the early motor vehicles depended on DC batteries, any electrical equipment for these early motor vehicles operated off DC supplies.

Until the middle of the seventies, most vehicles were equipped with DC generators. Today, DC generators have been replaced by alternators that internally generate alternating current (AC) power that is then rectified into DC output. It was the development of cost effective diodes in the sixties that allowed their adoption for use in alternators that replaced DC generators.

DC generators were not as reliable as alternators and were not able to meet continuous charge and electrical accessory requirements over the variable engine speeds from engine idling to highway speeds. Alternators are much more able to provide stable output over the operating range with a much longer vehicle service life, low weight, higher compactness and high electrical efficiency. As the demand for onboard electrical energy increases, manufacturers can increase the size and output characteristics of alternators. Within physical limits, aftermarket upgraded alternators can be installed to help address additional electrical power demands.

Motor vehicle electrical consuming loads have differing duty cycles. The types of loads are divided between continuous loads, long duty cycle loads and short duty cycle loads. As motor vehicles transition from full internal combustion engine through hybrid combinations to full electric, the ability to sustain operation with the reduced reliance on onboard batteries that add significant weight to the vehicle, particularly lead-acid types, becomes problematical.

As the internal combustion engine motor vehicle gives way to hybrid electric and fully electric motor vehicles, the storage of power and power generating systems will have to incorporate more sources of power generation and storage to replace the energy sources commonly used with internal combustion engine motor vehicles. Current onboard electrical power systems or subsystems are insufficient to sustain long-distance travel for full electric vehicles or internal combustion engine hybrid vehicles with supplemental direct drive traction motor.

The microgrid electrical system described here envisions multiple onboard electrical power generating and energy storage systems that must be able to be joined to a motor vehicle mobile micro grid that redistributes this generated and stored power to vehicle electrical consuming devices and systems. Each of these devices or subsystems must be controlled through a controller network that is parallel to the device and subsystems network.

It is envisioned that all sources of electrical power, whether AC or DC, be conditioned to a high voltage DC buss. The interconnect distribution wiring infrastructure can be designed for economic benefit without significant sacrifice of efficiency. An electrical transmission grid is a network of power sources, transmission conditioners, transmission busses, storage devices and electromechanical devices that require electricity to function. DC transmission does not result in reactive losses as with AC transmission. Transfers of energy from renewable sources on the vehicle are intermittent and, by nature, have wide dynamic ranges, so that the interface must be DC.

For example, solar photovoltaic panels or small wind turbines depend on climatic conditions to operate and produce electrical energy. When operating alone, they can be poor sources of power. However, systems that merge sources, such as wind, sun and other renewable sources, produce more effective energy. The system proposed here constitutes a distributive source of power, distributed by DC busses to a distributed group of electrical consuming or storage devices and systems. Each device or subsystem represents a node on the microgrid buss.

Electrical power is always subject to losses in transmission whether for short distances between components on a printed circuit board or over long distance high voltage lines. The major contributor to power loss in transmission is $I^2R$ losses (Joule losses):

$$P_{loss}=I^2R$$

Since the power, P, is the product of current, I, and voltage, V, $$I=P/V$$

Therefore, $$P_{loss}=(P/V)^2R=(P^2/V^2)R$$

Power loss is proportional to transmission line resistance and inversely proportional to the square of the transmission voltage. Therefore, power loss is minimized by low resistance and high voltage.

For intrastate and interstate grids, high voltage direct current transmission is not uncommon.

BRIEF DESCRIPTION OF THE DRAWINGS

FIG. 1 is a representation of average internal combustion engine motor vehicle power requirements.

FIG. 2 is a schematic embodiment the CAN control system for the additional electrical generation sources and storage subsystems not provided by the vehicle manufacturer.

FIG. 3 is an embodiment of the invention as applicable to a private passenger vehicle.

FIG. 4 is an embodiment of the invention as applicable to a midsized commercial intra-city delivery truck.

FIG. 5 is an embodiment of the invention as applicable to a commercial interstate heavy-duty tractor-trailer truck.

DETAILED DESCRIPTION

Even for small grid topographies, as would be the case for motor vehicle mobile microgrid, high voltage DC transmission is still appropriate. The many sources of electrical power on this micro grid are reduced to a common mode for use on a low-loss bidirectional buss system. High voltage DC links on the motor vehicle mobile micro grid overcome variations in source generated electrical energy and allow conversion to electrical signals by consuming devices operating along the motor vehicle mobile micro grid. High voltage direct current busses are restricted in their use only by thermal and voltage drop limits determined by their physical design and electrical properties.

It is the object of the electrical microgrid system described here to provide a methodology to take advantage of the multiple sources of energy available to motor vehicles, store these energy sources electrically, chemically or mechanically for immediate use or for later conversion to electrical power as requirements for the vehicle demands.

The system described here is to be used to accomplish this transition using new onboard generating components and subsystems, their conversion to a common distribution buss, energy storage and delivery and reconversion for use by onboard consuming devices. A control system is suggested as a means to manage the acquisition network of energy from multiple sources, store energy (mechanical, chemical, electrical, etc.) for use and convert and distribute electrical energy to consuming devices or subsystems, such as vehicle in-wheel electric motors as described in patent: James, U.S. Pat. No. 8,353,375 B2, Jan. 15, 2013 and is incorporated here by reference. Each device or subsystem on the network constitutes a node requiring control of its function.

A typical automobile may have more than 70 electronic control units (ECU) for various subsystems. The biggest processing system covers the engine control. Other subsystems include transmission, airbags, brakes, cruise control, environmental control, radio, mirrors, etc. A subsystem may need to control actuators or receive sensor feedback. As seen in FIG. 1, duty cycle segregates groups of loads. These groups can be further partitioned and with additional loads when considering the needs of hybrid and fully electric automotive designs. These subdivisions or partitions will be based on voltage type and function of the consuming device or system.

To control devices and subsystems that constitute the microgrid, an exemplary embodiment for the controller network is the Controller Area Network (CAN) as shown in FIG. 2. CAN is a serial network technology that was designed for the automotive industry. The CAN buss is used in embedded automotive systems that provides real time communication among microprocessor control devices for real-time management of vehicle activities and events. It is a two-wire, half duplex, high-speed network system. Its main advantage results from the reduction in installation materials and maintenance intensiveness and increased performance of a multiprocessor distributed communication system.

Each of the energy generation, storage or consumption device systems on the mobile microgrid is a microprocessor-controlled system. For such distributed systems, the CAN network technology allows for effective and efficient communication throughout the linked microgrid system.

Each node in the microgrid is able to send and receive messages, but not simultaneously. Devices or systems are not connected directly to the microgrid buss, but through a specific device or system microprocessor and a CAN controller. Intel and Philips produced the first CAN controller chips in 1987.

CAN features an "arbitration free" transmission. Message transmissions are usually event-driven. A CAN message that is transmitted with highest priority "wins" the arbitration, and the node transmitting the lowest priority will sense this and await its turn. A message consists of an identity (ID) and up to eight data bytes. Because the CAN standard does not transport data messages longer that one message of eight bytes, many implementations of higher level protocols were created to accomplish complex tasks such as motor control requiring transmission of larger data blocks.

The Society of Automotive Engineers (SAE) has developed a set of higher-level protocol standards for Truck and Bus Control and Communications specifying the design and use of devices that transmit electronic signals and control information among vehicle components. The SAE standard J1939 and its companion documents along with CAN implementation provide the backbone for vehicle inter-device communication and control.

Complimenting the SAE standards, the implementation of a CAN system is governed by the International Organization for Standardization (ISO). For ISO, the standards are ISO 118981 and ISO 118982, which replaced the original 1993 ISO 11898 standard, titled "Road Vehicles—Controller Area Network (CAN)". ISO 119921 is the standard for fault-tolerant communication for tractor-trailers motor vehicles.

Other higher-level protocols include CANopen, Device-Net and SDS (Smart Distributed System). CAN is one of five protocols used for OBDII, the onboard vehicle diagnostics standard, mandatory on all cars and light trucks sold in the U.S. since 1996, and the European EOBD standard mandatory on all motor vehicles sold in the E. U. since 2001 and all diesel vehicles since 2004.

The sources of generated electrical energy are:
1. Derived from the vehicle by means of:
   A. Engine heat conversion;
   B. Vehicle motion.
2. External independent sources:
   A. Renewable energy sources;
   B. Supplemental add-on systems. Excess, unutilized electrical energy requires a means to:
3. Store the energy until needed:
   A. Direct electrical storage;
   B. Mechanical energy storage.

Referring to FIG. 3, FIG. 4 and FIG. 5, each of the exemplary energy sources and energy storage subsystems are identified for private passenger vehicle (FIG. 3), intra-city commercial truck (FIG. 4) and intrastate and interstate Class 8 tractor-trailer truck (FIG. 5), respectively. The most likely location on each type of vehicle for these identified sources and subsystems are suggested in the descriptions for each and are identified on the respective figures for each type of vehicle. Locations are typically (1) under the hood in the engine compartment and exhaust subsystem, (2) enclosed within the vehicle or (3) attached to the outer surfaces of the vehicle. As one might expect, the energy storage subsystem locations on the smallest vehicles are determined by the convenience of the location.

Electrical Energy Derived from Enhanced Existing Typical Sources

Larger, More Powerful Alternators (Number 1 in Each Figure of the Exemplary Vehicles)

Passenger vehicles and light truck vehicles typically use "claw pole" configured alternators in which the opposing fields are energized by a single winding. Larger vehicles may use salient pole configurations. The automotive alternator is usually belt-driven at a few times the crankshaft speed but are not restricted to certain rotational speeds because the generated alternating current is rectified to direct current.

Buses, tractors and other heavy equipment may have alternators that produce 300 amperes. Older passenger vehicles may have alternators that produce only 30 amperes while more recently manufactured passenger vehicles may have output at 50 to 70 amperes. Semi-trucks have typically rated alternators with output around 140 amperes.

Today, many alternator voltage regulators are linked to the vehicles onboard computer system in which many factors are monitored for consideration in adjusting battery-charging voltage required from the alternator.

These enhanced alternators are most likely to be located in the engine compartment of a vehicle.

Battery Replacement Technologies (Number 2 in Each Figure of the Exemplary Vehicles)

Individual batteries are usually arranged into large battery packs of various voltage and ampere-hour capacity products. Battery pack designs are complex and vary widely by manufacturer and specific application. They will always incorporate many discrete cells connected in series or parallel to achieve total voltage and current requirements of the pack. Battery packs can contain several shared individual cells; individual cells may be arranged as multi-cell modules before final configuration as a battery pack.

Banks of conventional lead-acid batteries are still commonly used. Lead-acid batteries can result in significant (25% to 50%) portion of the vehicle mass. They have significantly lower energy density than petroleum fuels in this case, 30 to 40 Wh/Kg. Charging and operation of lead-acid batteries typically results in the emission of hydrogen, oxygen and sulfur, which are naturally occurring and normally harmless, if vented properly.

Nickel-metal-hydride batteries are now considered a relatively mature technology. While less efficient (60% to 70%) in charging and discharging than even lead-acid, they boast an energy density of 30 to 80 Wh/Kg, far higher than lead-acid. When used properly, nickel-metal-hydride batteries can have exceptionally long lives. Drawbacks include the poor efficiency, high self-discharge and poor performance in cold weather.

The sodium or "Zebra" battery uses a molten Chloroaluminate (NaAlCl4) sodium electrolyte. This chemistry is also referred to as "hot salt". The Zebra battery boasts an energy density of 120 Wh/Kg and reasonable series resistance. Since the battery must be heated for use, cold weather does not strongly affect its operation except for in increasing heating costs. The drawbacks of the Zebra battery include poor power density (<300 W/Kg) and the requirement of having to heat he electrolyte to approximately 270° C.

Lithium-ion batteries dominate the most recent battery development. The traditional lithium-ion chemistry involves a lithium-cobalt oxide cathode and graphite anode. This yields cells with an impressive 200+ Wh/Kg energy density and good power density, and 80% to 90% charger/discharge efficiency. The drawbacks of traditional lithium-ion batteries include short cycle lives (hundreds to a few thousand cycles) and significant degradation with age.

The lithium-iron-phosphate (LiFePO$_4$) battery is expected to last for at least ten (10) years and 7000+ charge cycles. The LiFePO$_4$ technology has yielded batteries that have higher miles/$ over the life of the packs but they require a complex control system. Lithium-vanadium oxide batteries are another promising variation.

For safety when working with battery packs, the pack can have a main fuse which limits the current of the pack under a short-circuit condition. A disconnect device can be incorporated to segregate battery pack modules containing individual cells to facilitate technician service with reduced danger to discharge. The standard for plugin charging connector systems for vehicle battery charging is SAE 1772 conductive connector. Another technique for charging without direct electrical connection is inductive charging using transformer induction.

The safety issues of batteries used in hybrid and electric vehicles are described in the international standard ISO 6469 and covers three specific areas: (1) onboard electrical storage (batteries); (2) functional safety and protection against failures; (3) protection for persons against electrical hazards. Firefighters and rescue personnel receive special training to deal with the higher voltages and chemicals encountered in hybrid and electric vehicle accidents.

A Battery Management System (BMS) is responsible for communication with the systems to which the battery pack is connected in a hybrid or electric vehicle. It also contains a variety of voltage, current and temperature sensors and relays to operate the pack effectively and safely The cost of the battery in a hybrid or pure electric vehicle distributed over useful life of the vehicle (up to ten years) of an internal combustion engine vehicle can easily be more than the cost of the electricity. This is due to the high initial cost relative to the life of the battery. Battery service life must be considered when calculating the extended cost of ownership because all batteries eventually wear out and must be replaced. When replacement is required depends on a number of factors. A solution to the mileage range problem is battery exchange or swap system, perhaps at current vehicle service stations. Battery weight is also a significant problem in this analysis. The future of batteries in hybrid and electric vehicles depends primarily on cost coupled with energy density, power density and extended life cycle capabilities.

Batteries can be located as a matter of convenience. Single batteries can be accommodated in the engine compartment; multiple battery banks can be located in the passenger vehicle trunk or the undercarriage of commercial trucks.

Electrical Energy Derived from Engine Heat Conversion

The concept of using the waste energy from one technology device as the input to the same or another technology device creates a cascading system that successively derives useful energy from the preceding device. In this cascaded system, the maximum efficiency can be obtained from all major heat sources.

It is important to note that the First and Second Laws of Thermodynamics preclude perfect recovery of energy; entropy will always claim some portion of any waste heat generated by any of the systems described here.

Thermoacoustic Electrical Generator (Number 3 in Each Figure of the Exemplary Vehicles)

Thermoacoustic cycle (TAC) generators convert heat into electricity without pollution. In automotive applications in which the vehicle is either primarily an internal combustion engine vehicle or a hybrid with both an internal combustion engine and an electric motor, heat is generated in the internal combustion engine. Internal combustion engines vary in efficiency from around 13% for a passenger vehicle to, perhaps, 25% for a heavy-duty truck. The lost efficiency is mainly heat. The heat lost is described as waste heat; i.e., exhausted to the environment without further use.

While a thermoacoustic generator can generate power from any combustible fuel source, its most beneficial application is energy recovery from waste heat. This is particularly true for heat generated in an internal combustion engine vehicle. For example, when installed in the engine exhaust system, manifold or tailpipe, it can generate electricity. It can be installed in multiple units in the exhaust system for greater power generation.

In a TAC device, a traveling wave is established in a thermoacoustic cycle generator that causes a reciprocating motion of a permanent magnet piston through the center of a surrounding wire coil. The result is an induced current in the surrounding coil. As the piston oscillates in a reciprocating motion, an alternating current is induced in the coil.

TAC devices are integrally mounted in the vehicle exhaust system or where sufficient heat is generated, collected and exhausted through a manifold system.

MEMSTAR Generator (Number 4 in Each Figure of the Exemplary Vehicles)

Another device that uses heat to generate electricity is a microelectromechanical system thermoacoustic resonator known by the acronym, MEMSTAR. The device is manufactured similar to a semiconductor device using the same photolithographic and chemical etching processes that produce computer chips. Like computer chips, a MEMSTAR device is a multilayer fabricated device with integrated power conditioning and control circuitry. The device is sealed in a metal enclosure much the same as high-reliability military and aerospace devices. The device also produces an alternating current output.

As with the thermoacoustic generator described earlier, a MEMSTAR device can convert waste automotive vehicle exhaust into electrical power. For heavy-duty tractor-trailers, an array of MEMSTAR devices can be mounted on the trailer roof to collect solar energy for conversion to electricity.

Using economies-of-scale analysis for semiconductor manufacturing could produce electricity for pennies per watt versus thin-film photovoltaic devices at several dollars per watt or crystalline photovoltaic devices at several tens of dollars per watt.

Turbo-Supercharger Generator (Number 5 in Each Figure of the Exemplary Vehicles)

Another turbine source is the turbo-supercharger installed in some high performance passenger vehicles and increasingly on newer heavy-duty truck internal combustion engines. These devices use exhaust gas from the engine to improve engine performance by forcing compressed air into the combustion chambers, allowing more fuel to be burned, resulting in a larger power output.

Turbo-superchargers are actually heat engines, converting some thermal energy from the exhaust gas that would otherwise be wasted into useful work. This is not totally "free energy", because it always creates some amount of exhaust backpressure that the engine must overcome. Turbo-superchargers use output energy to achieve a net gain, which is at the expense of the engine's total output.

Nevertheless, while it is not efficient to use the turbo-supercharger for electrical generation while it is engaged in acceleration of the vehicle or relatively steady-state speed, there is nothing to prevent diversion of use of the turbo-supercharger to the generation of electrical energy during the same conditions that facilitate regenerative braking. Use of the turbo-supercharger diverted from engine acceleration to electrical power generation will result in enhanced engine braking. The exhaust backpressure aids in slowing the engine and, therefore, the vehicle. The output may be diverted to couple mechanically utilizing its pressurized exhaust to force rotation of a mechanical shaft attached to the armature of a dynamo or generator.

Turbochargers are most likely located in the engine compartment of vehicles.

Electrical Energy Derived from Vehicle Motion

Regenerative Braking Generator (Number 6 in Each Figure of the Exemplary Vehicles)

Regenerative braking attempts to capture some of the kinetic energy of a, moving vehicle as the vehicle slows down. Without regenerative braking, the kinetic energy would be lost as heat dissipated to the environment.

In electric vehicles or in hybrid vehicles, when the driver removes his or her foot from the accelerator to the brake pedal, the vehicle's electric motor is switched to reverse mode. Typically, the motor in electric and hybrid vehicles are constructed using permanent magnet rotors and electrically energized stators. With the brakes applied, the stator winding is routed to an energy storage system, typically storage battery or capacitor banks. As the motor rotor continues to turn while the vehicle slows down, the permanent magnets on the rotor induce a reverse current on the stator. This current is used to charge the battery or capacitor bank for later use when reaccelerating the vehicle.

Regenerative braking systems are most likely located as part of the tire and rim assembly of vehicles.

Idler Wheel Generator (Number 7 in Each Figure of the Exemplary Vehicles)

Another way to capture energy from a decelerating vehicle is to allow an idler wheel to engage the rotating tires of the vehicle. The idler wheel is itself a generator or is mechanically attached to a generator. The idler wheel is engaged when the vehicle is decelerating.

Idler wheel are located on a vehicle chassis at a place allowing contact with a rotating tire.

Descending Road Grade Energy Recapture (Number 8 in Each Figure of the Exemplary Vehicles)

Recapture of kinetic energy can occur when a vehicle is descending a downward road grade. Any system used for electrical generation due to vehicle slowing can be utilized during downward road grade. The vehicle may speed up controllably when traversing a downgrade, but the system that recapture kinetic energy when slowing can just as easily recapture kinetic energy when the vehicle speed is increasing without engine assistance.

"Jake Brake" Generator (Number 9 in Each Figure of the Exemplary Vehicles)

In heavy-duty vehicles using diesel internal combustion engines, the "Jake Brake" is used to modify engine valve operation in order to use engine compression to slow the vehicle. When the accelerator on a heavy-duty truck is released, the truck's forward momentum continues to turn the camshaft and compress air in the diesel engine's cylinders. When the camshaft passes top-dead-center, the compressed air in the cylinders acts as a spring and pushes the piston back down the cylinder, returning energy to the camshaft and pushing the truck forward. This is not an aid to slowing the truck. However, a compression release engine brake—a Jake Brake—uses a solenoid valve to open the exhaust valve at the top of the compression stroke. This release of the compressed air in the cylinder prevents the energy from being applied to the piston and hence does not contribute to camshaft rotation or truck forward motion. The energy release through the solenoid valve, normally released to the exhaust system, can be captured for use as mechanical energy in the form of rotational power to again provide electrical power by a rotating armature of a dynamo or generator.

The "Jake Brake" is necessarily located in the engine compartment for diesel engine trucks, particularly heavy-duty tractor-trailer trucks.

Wind Turbine Generator (Number 10 in Each Figure of the Exemplary Vehicles)

One would not likely think of a wind turbine as having application to electrical energy generation for a vehicle, passenger or commercial heavy-duty truck. One thinks immediately of the typical wind turbine with its giant propeller capturing the wind to mechanically turn a shaft attached to the armature of a dynamo or generator. A conventional wind turbine is fixed in location and relies for its function on the natural flow of air currents. "Wind Farms" are specifically located on landscape where air currents are essentially continuous.

When a vehicle is in motion, it moves through the air. Thus, by the principle of superposition, a propeller mounted on a vehicle facing forward as the vehicle moves, will respond to the forced air flow by rotating.

A child's pinwheel toy is an excellent example: with the wind blowing, the pinwheel spins when held in a fixed position facing the direction of the wind. Without a natural flow of wind, the pinwheel must be moved through space to make it spin.

Obviously, the conventional propeller is not practical for mounting on a vehicle moving along a thoroughfare. However, there are devices that can be more practically adapted to a moving vehicle.

For example anemometers are typically found mounted on wind turbine towers to measure wind velocity and/or pressure. Cup anemometers are the simplest in design consisting of hemispherical cups each mounted on one end of a horizontal arm attached to a center hub that is free to rotate about its center. The air flowing past the cups in any horizontal direction causes the cups to rotate about the common axis at a rate proportional to the speed of the airflow. It was determined that a three-cup design displaced 120° from each other had more consistent torque and responded to wind gusts more quickly than the four-cup anemometer.

While the classic anemometer was never considered for use as a wind turbine, for adaptation to a moving vehicle, the cups of an anemometer can capture the air flow passing across the surfaces of a moving vehicle more practically than a mounted propeller. A shaft forced to turn by air flowing across the vehicle surface can be mechanically attached to an armature of a dynamo or generator. In fact, very small and many anemometers can be utilized.

This technique can recover some—not all, of course—of the energy lost in propelling a vehicle through the "drag" losses of air. This energy may be used directly or stored. Furthermore, if determined to be disadvantageous to overall efficiency during vehicle acceleration or relative steady state speed, the anemometer wind turbine can be used as a regenerative braking system for kinetic energy recapture and storage as the vehicle slows and comes to a halt—a form of air brake.

A variance to the cupped anemometer is to substitute angled fins for the cups and their attached arm. The fins can be exposed or partially enclosed, but still accessible to air flow across the vehicle surfaces. These devices may be mounted on vehicles with less visibility with the use of mounted panels directing the flow of air onto the surfaces of the air capturing cups or fins. There are other configurations of devices designed to capture airflow for the purpose of shaft and its load.

Vehicle Vibratory Generator (Number 11 in Each Figure of the Exemplary Vehicles)

Any vehicle traveling across the smoothest roadbed is subject to vibration. The springs and shock absorbers in any vehicle are designed to smooth out these induced vibrations. Nevertheless, this is an energy loss on a vehicle that is subject to energy recovery.

Indeed, the thermoacoustic generator described earlier produces electricity by the traveling wave oscillations resulting from internal combustion engine manifold heat exhaust. The mechanism for capturing vibratory energy as electrical output relies on mechanically induced piston vibration that causes the piston with permanent magnets arranged along its axis of oscillation to pass through coils of wire causing the magnetic flux from the permanent magnets in motion to induce an electrical current in the coils. Like the thermoacoustic generator, the induced electrical current is alternating current. Each wheel of the vehicle may have a vibratory generator attached thereto for this purpose.

The small vibratory displacement in the vehicle springs and shock absorbers can also be mechanically amplified to provide larger displacement to better facilitate the mechanical or electrical power generation.

Electrical Energy Derived from External Sources

Auxiliary Power Units (Number 12 in Each Figure of the Exemplary Vehicles)

Auxiliary power units (APUs) are designed for heavy-duty truck tractor-trailers. These units provide truck engine preheating, battery charging, truck cab environmental control and supplementary electric power. It is not untypical for a driver to keep his truck engine idling while he attends to business or personal activities away from the truck. He may be waiting for his turn at the loading dock. Fleet managers particularly want APUs installed on the trucks to eliminate unnecessary idling, reduce unnecessary fuel consumption while providing environmental comfort to the driver. By not allowing the truck engine to idle, truck engine maintenance intervals are extended, engine wear is reduced and, where local law requires, they allow compliance with anti-idle laws. APU systems can run on a variety of fuels and represent a far more efficient fuel use than the truck engine.

Many states now require limited truck idling by required incorporation of a timing device to force an engine to shut down after a statutory specified time.

While APUs have as their primary task to operate when the engine is off to provide power for all non-motoring activity, their role can be expanded by suitable design configuration to provide electrical power for hybrid or electric vehicle functioning. APUs are, after all, generators for vehicle electric consuming devices aboard the truck. APUs can be adapted to private passenger vehicles, as well.

Another potential source of auxiliary electrical power is the high capacity, diesel-powered cooling and heating units found front-mounted on refrigerated trailers. These units also can be configured to provide electrical power for heavy-duty truck hybrid vehicle functioning.

Photovoltaic Generators (Number 13 in Each Figure of the Exemplary Vehicles)

Current volume-produced photovoltaic (PV) systems are constructed using rigid rectangular panels with silicon-based photovoltaic arrays. This type of construction is not easily adapted to private passenger motor vehicles and would be aesthetically unpleasant. However, the multiple panel arrays are easily adaptable to commercial tractor-trailers with typical rectangular rigid roofs to which these, and newer, thin panels may be attached. Trailers are typically 40 feet long and 8.5 feet wide and can easily accommodate multiple panel attachment without significant overall height increase that would affect trailer clearance of road or highway underpasses. Solar power systems are already common for recreational vehicle use.

Looming in the near horizon are thin film or paint surface conforming PV technologies already in production prototype and early volume manufacture from several manufacturers. The conforming films are adaptable to private passenger motor vehicles as well as to commercial motor vehicles. For private passenger and commercial vehicles with curved surfaces not easily adaptable to rigid panel PV devices, one can envision hood, roof and trunk coverage. Early adaptation to passenger vehicles could be aesthetically incorporated as in a Landau roof configuration.

Techniques in fabrication of PV systems have also been developed to absorb the entire spectrum from any sunlight incident angle. Experiments have been conducted using other semiconductors, inorganic nanocrystals, organic polymers and many other light-sensitive materials.

Fuel Cells (Number 14 in Each Figure of the Exemplary Vehicles)

Fuel cells are electrochemical devices that combine ions in a controlled way to produce electric power. The classic example of a fuel cell uses hydrogen and oxygen combined in the cell to produce electrical energy, heat and water. It is estimated that fuel cells can operate at efficiencies two to three times that of internal combustion engines. Fuels other than hydrogen (ethanol, methanol, propane, methane and biomass) have been demonstrated, but for current practical implementations, hydrogen remains the primary fuel.

The difficulty, of course, is the lack of hydrogen fuel filling stations. One option is to produce hydrogen in situ on the vehicle using photovoltaic energy to separate water molecules. This conversion process can occur while the vehicle is parked and when it is not drawing power for vehicle motive force.

Electrical power output from a fuel cell is direct current. There are over a dozen manufacturers offering commercially available fuel cells.

The heat from the sun and the heat generated by the vehicle systems can be used to create a high temperature electrolysis platform for more efficient dissociation of water into hydrogen and oxygen. A minimum temperature of 100° C. can be utilized to establish economic dissociation. Higher temperatures will improve efficiency but can represent a public hazard if an accidental release occurs in proximity to humans.

Hydrogen storage within the vehicle requires some refinement for commercial use. The methodologies include high-pressure containment, but usually focus on chemical compounds that reversibly release hydrogen upon heating. While the use of hydrogen fuel cells provides a popular view of fuel cells, fuel cell systems utilizing hydrogen-bonded molecular systems, such as hydride compounds, are more likely to be realized based on practical application and economic benefits.

A hydride is formed when hydrogen is combined with an atom or complex ion that is less electronegative than hydrogen itself. Calcium hydride is a solid crystalline material at room temperature. When melted at elevated temperature, these ionic crystals release hydrogen. When combined with a more complex electronegative ion, such as lithium aluminum hydride, the cation is $Li^+$ and the anion is the complex $AlH_4^-$; at room temperature, this compound is also a solid.

Fuel cells can be located in the passenger vehicle trunk or the undercarriage of commercial trucks.

Gas Turbine Generators (Number 15 in Each Figure of the Exemplary Vehicles)

Another class of external power sources for operating a vehicle utilizing electric power are turbine-based technologies. Unlike the turbo-superchargers described above that are typically included as part of the vehicle by the manufacturer, the gas turbine discussed here is an add-on system.

Gas turbine engines exist as replacement for a conventional internal combustion, piston actuated engine. That is not what is meant here, however. The purpose for applying turbine technologies envisioned here is for electrical power generation supporting the needs of hybrid or electric vehicles.

Gas turbines can be standalone devices using a variety of fuels to convert energy stored in the fuels to useful mechanical energy in the form of rotational power. The rotational power is converted to electrical power by rotating an armature of a dynamo or generator.

The output from such a system is natively alternating current. This is no different from a conventional alternator in a passenger or commercial motor vehicle, except that the rotating armature is not directly linked to the internal combustion engine camshaft but to an independent source of mechanical rotation. The output of the turbine can be used directly with conditioning for alternating current devices or converted to direct current to be distributed for use or conditioned energy storage utilizing the vehicle's micro grid buss system.

Like fuel cells, gas turbine generators can be located in the passenger vehicle trunk or the undercarriage of commercial trucks.

Microturbine Generator (Number 16 in Each Figure of the Exemplary Vehicles)

As a variation of the turbo-supercharger, microturbine generators are small-scale energy generating devices. They can range from handheld units producing less than a kilowatt to commercial sized systems that produce tens of kilowatts. This sizing is applicable to passenger and commercial heavy duty-trucks; they can be used to generate onboard electrical power. Moreover, they can use most commercial fuels as well as biogas.

Typical microturbine efficiencies are currently 25% to 35%. Microturbines produce waste heat that is concentrated in their exhaust that can be subsequently directed to other thermoelectric generating devices. This cogeneration with other technologies can raise the overall system efficiency to 80% or more.

Again, microturbine generators can be located in the passenger vehicle trunk or the undercarriage of commercial trucks.

Electrical Energy Storage Systems
Chemical Energy Storage (Number 17 in Each Figure of the Exemplary Vehicles)

In addition to classic lead-acid battery energy storage, new battery types (e.g., lithium ion) will be adopted to reduce weight and improve capacity and efficiency. Other chemical compounds exist that store energy for release in reactions that result in electron flow.

Storage for these systems is determined by convenience for small vehicles and is most likely the undercarriage for medium and heavy-duty trucks.

"Flow Battery" Energy Storage (Number 18 in Each Figure of the Exemplary Vehicles)

An optional battery storage system is the "Flow Battery": a flow battery is a form of rechargeable battery in which an electrolyte flows through a reaction chamber in which chemical energy is converted to electrical energy. The electrolyte is "used up" as it flows through the reactor producing electricity. The electrolyte must continuously flow through the reactor necessitating an external storage tank and a means to transfer additional electrolyte from the tank by gravity feed or pump. These peripheral storage and transfer systems make flow batteries difficult to adopt in practical designs. The chief advantage of a flow battery is its ability to be quickly recharged by adding new electrolyte to replace the expended electrolyte. Consequently, flow batteries are typically considered for large stationary applications.

Storage for these systems is determined by convenience for small vehicles and is most likely the undercarriage for medium and heavy-duty trucks.

Capacitor Bank Energy Storage (Number 19 in Each Figure of the Exemplary Vehicles)

A classic storage system is the use of capacitors to store charge until needed. Capacitors charge and discharge their stored energy quickly. For large storages capacity, safety to protect against unintended release is mandatory. The use of capacitors to store electrical charge has a long history. Techniques for utilizing this storage system are well developed and easily implemented. The primary disadvantage is cost; cost increases directly as charger storage capacity.

Electric double-layer capacitors (or "ultracapacitors) are used to store rapidly dischargeable energy with high power density, in order to keep batteries within safe resistive heating limits and extend battery life.

Storage for these systems is determined by convenience for small vehicles and is most likely the undercarriage for medium and heavy-duty trucks.

Mechanical Energy Storage Systems
Accumulator Energy Storage (Number 20 in Each Figure of the Exemplary Vehicles)

Another energy storage option for the captured energy is an accumulator. For example, the electric power created during regenerative braking is used to power a pump that forces hydraulic fluid from a low-pressure reservoir into a high-pressure accumulator, which, typically, compresses nitrogen gas. When the driver moves to accelerate the vehicle, the pressurized nitrogen gas is released and used to assist in the vehicle's acceleration by, as one option, forcing a generator armature to rotate producing electrical power for a hybrid or full electric vehicle.

Accumulator energy storage subsystems can be located in the passenger vehicle trunk or the undercarriage of commercial trucks.

Flywheel Energy Storage (Number 21 in Each Figure of the Exemplary Vehicles)

Flywheels are a popular consideration for energy storage. Flywheels require a mix of high mass and high rotational velocity to be effective for vehicle applications. The first flywheels used for energy storage were large steel discs rotating on mechanical bearings. Newer designs substitute carbon fiber composite discs having higher tensile strength than steel and are not as massive. As rotational speed is increased, mechanical bearings suffer greater functional losses; e.g., heat losses. To overcome this deficiency, magnetic bearings are necessary. Housing the flywheel in a vacuum chamber minimizes drag from air passing over the rotating surfaces.

The advantages found in flywheel systems are: (1) ambient temperature independence; (2) lack of environmental detriment; (3) accuracy of energy level stored due to easy rotation speed measurement. Disadvantages are: (1) need for strong containment housings due to potential disintegration of the flywheel at high speed that increase the total mass of the system; (2) gyroscopic effect, since the angular momentum can be sufficient to affect a vehicle's handling characteristics in a turn. This later disadvantage can be overcome by mounting paired flywheels that rotate in opposite directions, thus canceling out the individual gyroscopic effects.

Flywheel energy storage subsystems can be located in the passenger vehicle trunk or the undercarriage of commercial trucks.

What is claimed is:

1. A moving motor vehicle self contained on-board electrical power microgrid system management network comprising:
   converters, inverters, electromechanical conversion systems and subsystems; and
   power conditioners and buss interconnection that define a high voltage, low impedance electrical buss; and
   for collection, storage and distribution of:
      internal energy recovery sources; and
      installed external supplemental energy sources; and
      kinetic energy recovery sources; and
      renewable energy sources for primary vehicle on-board use;
   motor vehicle comprising one of an internal combustion engine motor vehicle, an electric motor vehicle or a hybrid combination of internal combustion and electric motor vehicle;
   internal energy recovery sources comprising devices and subsystems that convert waste heat from the internal combustion engine into electrical energy;

installed external supplemental energy sources comprising devices and subsystems appurtenant to the vehicle that convert fuel to mechanical energy and then to electrical energy;

kinetic energy recovery sources comprising devices and subsystems that convert kinetic energy of the vehicle to mechanical energy and then to electrical energy;

renewable energy sources comprising devices and subsystems that convert air motion or incident light radiation to useful heat, mechanical or direct electrical energy; and a common mode for use on a low-loss bidirectional buss system; and high voltage DC links on the motor vehicle mobile micro grid to overcome variations in source generated electrical energy;

and that allows conversion to electrical signals for consuming devices operating along the motor vehicle mobile micro grid.

2. The vehicle on-board electric power microgrid system management network of claim 1 comprising:

A Controller Area Network (CAN) for real-time communication among microprocessor control devices comprising a two-wire, half duplex, high-speed multiprocessor distributed communication network system;

Said CAN communication network system comprising standard vehicle inter-device communication of electronic signals and control information among vehicle components including inter-device communication compliant with SAE standard J1939 or fault-tolerant communication ISO 119921 standard for tractor-trailers motor vehicles.

3. The vehicle on-board electric power microgrid system management network of claim 2, wherein CAN communication network system comprises higher-level protocols including one of a group comprising CANopen, DeviceNet and SDS (Smart Distributed System).

* * * * *